(12) United States Patent
Yamashita

(10) Patent No.: US 7,286,298 B2
(45) Date of Patent: Oct. 23, 2007

(54) ZOOM LENS

(75) Inventor: Atsushi Yamashita, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 58 days.

(21) Appl. No.: 11/002,401

(22) Filed: Dec. 2, 2004

(65) Prior Publication Data

US 2005/0134971 A1 Jun. 23, 2005

(30) Foreign Application Priority Data

Dec. 17, 2003 (JP) ............................ 2003-419261

(51) Int. Cl.
 *G02B 15/14* (2006.01)
(52) U.S. Cl. ...................................... 359/687
(58) Field of Classification Search ................ 359/683, 359/687
See application file for complete search history.

(56) References Cited

U.S. PATENT DOCUMENTS 4,690,513 A * 9/1987 Takahashi et al. .......... 359/686
6,178,049 B1 * 1/2001 Mukaiya et al. ............ 359/687

FOREIGN PATENT DOCUMENTS

| JP | 2002-006216 | 1/2002 |
| JP | 2002-244039 | 8/2002 |
| JP | 2003-315676 | 11/2003 |

* cited by examiner

*Primary Examiner*—Scott J. Sugarman
(74) *Attorney, Agent, or Firm*—Cohen Pontani Lieberman & Pavane LLP

(57) ABSTRACT

In a zoom lens of this invention, a first lens group having a positive refraction power, a second lens group having a negative refraction power, a third lens group having a positive refraction power, and a fourth lens group having a positive refraction power are arranged sequentially from an object side toward an image side, and the magnification is changed from the wide angle end of the zoom lens to the telephoto end thereof, and vice versa, by varying each distance between each pair of the first to the fourth lens groups. The first lens group includes a positive lens and a negative lens. The third lens group includes at least a positive lens and a negative lens arranged sequentially from the object side toward the image side. At least the positive lens of the third lens group is a spherical lens. That lens of the third lens group which is located closest to the image side is a lens having an aspherical surface on at least one surface thereof.

71 Claims, 8 Drawing Sheets

WIDE ANGLE END

INTERMEDIATE

TELEPHOTO END

SPHERICAL ABERRATION { SOLID LINE : d LINE, DOTTED LINE : g LINE }

ASTIGMATISM { SOLID LINE : SAGITAL IMAGE PLANE, DOTTED LINE : MERIDIONAL IMAGE PLANE }

WIDE ANGLE END

INTERMEDIATE

TELEPHOTO END

SPHERICAL ABERRATION { SOLID LINE : d LINE / DOTTED LINE : g LINE }   ASTIGMATISM { SOLID LINE : SAGITAL IMAGE PLANE / DOTTED LINE : MERIDIONAL IMAGE PLANE }

WIDE ANGLE END

F2.88     ω=31.2°     ω=31.2°

SPHERICAL ABERRATION    ASTIGMATISM    DISTORTION

INTERMEDIATE

TELEPHOTO END

SPHERICAL ABERRATION { SOLID LINE : d LINE / DOTTED LINE : g LINE }

ASTIGMATISM { SOLID LINE : SAGITAL IMAGE PLANE / DOTTED LINE : MERIDIONAL IMAGE PLANE }

WIDE ANGLE END

SPHERICAL ABERRATION   ASTIGMATISM   DISTORTION

SPHERICAL ABERRATION { SOLID LINE : d LINE
DOTTED LINE : g LINE

ASTIGMATISM { SOLID LINE : SAGITAL IMAGE PLANE
DOTTED LINE : MERIDIONAL IMAGE PLANE

ZOOM LENS

This application is based upon and claims priority under 35 U.S.C. § 119 from the Japanese Patent Application No. 2003-419261 filed Dec. 17, 2003, at least entire content are incorporated herein by reference.

BACKGROUND OF THE INVENTION

1. Field of the Invention

The present invention relates to a zoom lens and, more particularly, to a zoom lens used for, for example, a digital camera using a CCD.

2. Description of the Prior Art

Conventionally, as zoom lenses in this field, the zoom lenses disclosed in Japanese Unexamined Patent Publication Nos. 2002-244039 and 2002-006216 have been available.

Japanese Unexamined Patent Publication No. 2002-244039 discloses a zoom lens in which a first lens group having a positive focal length, a second lens group having a negative focal length, and third, fourth, and fifth lens groups each having a positive focal length are arranged from the object side toward the image side, and an aperture stop is provided near the third lens group. In this embodiment, the number of lenses is 11 or 12, the zoom ratio is about 4.7, and the field angle at the wide angle end is about 66°.

Japanese Unexamined Patent Publication No. 2002-006216 discloses a zoom lens in which a first lens group having a positive focal length, a second lens group having a negative focal length, a third lens group having a positive focal length, and a fourth lens group having a positive focal length are arranged from the object side toward the image side. In this embodiment, the number of lenses is 11 the zoom ratio is about 4.9, and the field angle at the wide angle end is about 60°.

In the field of cameras, as well, including, for example, digital cameras and video cameras which use CCDs (Charge Coupled Devices) and CMOSs (Complementary Metal Oxide Semiconductors), there have recently been increasing demands for compact, low-cost zoom lenses having high zoom ratios and wide field angles.

In order to meet these demands, however, an overall lens system needs to be comprised of the minimum number of lenses even though a high zoom ratio and a wide field angle at the wide angle end are required. In addition, an optimal zoom lens type, a proper lens arrangement, a proper lens power distribution, and the like must be selected.

From this point of view, the zoom lens disclosed in Japanese Unexamined Patent Publication No. 2002-244039 has a complicated structure, that is, has a five lens group construction even for a zoom ratio of about 5.

Although the zoom lens disclosed in Japanese Unexamined Patent Publication No. 2002-006216 has a four group lens construction with a zoom ratio of about 5, the number of lenses is as large as 11 or more. In this embodiment, the number of lenses of the first lens group is three, and the number of lenses of the fourth lens group is two or three. As described above, for example, too many lenses makes it difficult to achieve reductions in size and cost.

SUMMARY OF THE INVENTION

The present invention has been made in consideration of the above problems in the prior art, and has as its object to provide a low-cost zoom lens which is comprised of a small number lenses and has, in particular, a field angle of 60° or more at the wide angle end and a zoom ratio of about 5.5 to 7 so as to be suitably used for a digital camera, video camera, or the like.

In order to achieve the above object, the present invention has the following aspects.

(1) There is provided a zoom lens which comprises a first lens group having a positive refraction power, a second lens group having a negative refraction power, a third lens group having a positive refraction power, and a fourth lens group having a positive refraction power which are arranged sequentially from an object side, and changes a magnification from a wide angle end of the zoom lens to a telephoto end thereof, and vice versa, by varying each distance between each pair of the first to the fourth lens groups, characterized in that the first lens group comprises a positive lens and a negative lens, the third lens group comprises at least a positive lens and a negative lens arranged sequentially from the object side, at least the positive lens of the third lens group is a spherical lens, and a lens of the third lens group which is located closest to the image side is a lens having an aspherical surface on at least one surface thereof.

(2) The zoom lens described in aspect (1) is characterized in that an aperture stop is placed in an air gap between the second lens group and the third lens group.

(3). The zoom lens described in aspect (2) is characterized in that the positive lens of the third lens group is a glass spherical lens formed by polishing.

(4). The zoom lens described in aspect (1), (2), or (3) is characterized in that the fourth lens group comprises one positive lens.

(5) The zoom lens described in aspect (4) is characterized in that the positive lens of the fourth lens group has an aspherical surface on at least one surface thereof.

(6) The zoom lens described in aspect (4) or (5) is characterized in that the positive lens of the fourth lens group is made of a plastic and satisfies $$0.10 < f_W/f_4 < 0.60 \quad [1]$$

where $f_W$ is a focal length of an overall system at a wide angle end, and $f_4$ is a focal length of the fourth lens group.

(7) The zoom lens described in aspect (4) or (5) is characterized in that the positive lens of the fourth lens group is made of a plastic and satisfies $$0.20 < f_W/f_4 < 0.40 \quad [2]$$

where $f_W$ is a focal length of an overall system at a wide angle end, and $f_4$ is a focal length of the fourth lens group.

(8) There is provided a zoom lens which comprises a first lens group having a positive refraction power, a second lens group having a negative refraction power, a third lens group having a positive refraction power, and a fourth lens group having a positive refraction power which are arranged sequentially from an object side, and changes a magnification from a wide angle end of the zoom lens to a telephoto end thereof, and vice versa, by varying each distance between each pair of the first to the fourth lens groups, characterized in that the first lens group comprises one positive lens and one negative lens, the third lens group comprises at least two positive lenses and one negative lens, and a lens of the third lens group which is located closest to the image side is a lens having an aspherical surface on at least one surface thereof.

(9) The zoom lens described in aspect (8) is characterized in that an aperture stop is placed in an air gap between the second lens group and the third lens group.

(10) The zoom lens described in aspect (8) or (9) is characterized in that the lens of the third lens group which is located closest to the object side is a glass spherical lens formed by polishing.

(11) The zoom lens described in aspect (8), (9), or (10) is characterized in that the fourth lens group comprises one positive lens.

(12) The zoom lens described in aspect (11) is characterized in that the positive lens of the fourth lens group has an aspherical surface on at least one surface thereof.

(13) The zoom lens described in aspect (11) or (12) is characterized in that the positive lens of the fourth lens group is made of a plastic and satisfies $$0.10 < f_W/f_4 < 0.60 \quad [1]$$

where $f_W$ is a focal length of an overall system at a wide angle end, and $f_4$ is a focal length of the fourth lens group.

(14) The zoom lens described in aspect (11) or (12) is characterized in that the positive lens of the fourth lens group is made of a plastic and satisfies $$0.20 < f_W/f_4 < 0.40 \quad [2]$$

where $f_W$ is a focal length of an overall system at a wide angle end, and $f_4$ is a focal length of the fourth lens group.

(15) There is provided a zoom lens which comprises a first lens group having a positive refraction power, a second lens group having a negative refraction power, a third lens group having a positive refraction power, and a fourth lens group having a positive refraction power which are arranged sequentially arranged from an object side, and changes a magnification from a wide angle end of the zoom lens to a telephoto end thereof, and vice versa, by varying each distance between each pair of the first to the fourth lens groups, characterized in that the first lens group comprises one positive lens and one negative lens, a lens of the third lens group which is located closest to the image side has an aspherical surface on at least one surface thereof, and the fourth lens group comprises one positive lens.

(16) The zoom lens described in aspect (15) is characterized in that an aperture stop is placed in an air gap between the second lens group and the third lens group.

(17) The zoom lens described in aspect (15) or (16) is characterized in that the lens of the third lens group which is located closest to the object side is a glass spherical lens formed by polishing.

(18) The zoom lens described in aspect (15), (16), or (17) is characterized in that the positive lens of the fourth lens group has an aspherical surface on at least one surface thereof.

(19) The zoom lens described in aspect (18) is characterized in that the positive lens of the fourth lens group is made of a plastic and satisfies $$0.10 < f_W/f_4 < 0.60 \quad [1]$$

where $f_W$ is a focal length of an overall system at a wide angle end, and $f_4$ is a focal length of the fourth lens group.

(20) The zoom lens described in aspect (18) is characterized in that the positive lens of the fourth lens group is made of a plastic and satisfies $$0.20 < f_W/f_4 < 0.40 \quad [2]$$

where $f_W$ is a focal length of an overall system at a wide angle end, and $f_4$ is a focal length of the fourth lens group.

(21) The zoom lens described in any one of aspects (1) to (20) is characterized in that the lens of the third lens group which is located closest to the image side is made of a plastic and satisfies $$-0.15 < f_W/f_{3i} < 0.15 \quad [3]$$

where $f_W$ is a focal length of an overall system at a wide angle end, and $f_{3i}$ is a focal length of the lens of the third lens group which is located closest to the image side.

(22) The zoom lens described in aspect any one of aspects (1) to (20) is characterized in that the lens of the third lens group which is located closest to the image side is made of a plastic and satisfies $$-0.05 < f_W/f_{3i} < 0.05 \quad [4]$$

where $f_W$ is a focal length of an overall system at a wide angle end, and $f_{3i}$ is a focal length of the lens of the third lens group which is located closest to the image side.

(23) The zoom lens described in any one of aspects (1) to (22) is characterized in that the first lens group satisfies $$0.10 < f_W/f_1 < 0.40 \quad [5]$$

where $f_W$ is a focal length of an overall system at a wide angle end, and $f_1$ is a focal length of the first lens group.

(24) The zoom lens described in any one of aspects (1) to (22) is characterized in that the first lens group satisfies $$0.10 < f_W/f_1 < 0.20 \quad [6]$$

where $f_W$ is a focal length of an overall system at a wide angle end, and $f_1$ is a focal length of the first lens group.

(25) The zoom lens described in any one of aspects (1) to (24) is characterized in that the second lens group satisfies $$1.2 < \beta_{2T}/\beta_{2W} < 4.0 \quad [7]$$

where $\beta_{2T}$ is a magnification of the second lens group at a telephoto end end, and $\beta_{2W}$ is a magnification of the second lens group at a wide angle end.

(26) The zoom lens described in any one of aspects (1) to (24) is characterized in that the second lens group satisfies $$2.0 < \beta_{2T}/\beta_{2W} < 3.0 \quad [8]$$

where $\beta_{2T}$ is a magnification of the second lens group at a telephoto end, and $\beta_{2W}$ is a magnification of the second lens group at a wide angle end.

(27) The zoom lens described in any one of aspects (1) to (26) is characterized in that the third lens group satisfies $$1.2 < \beta_{3T}/\beta_{3W} < 4.0 \quad [9]$$

where $\beta_{3T}$ is a magnification of the third lens group at a telephoto end, and $\beta_{3W}$ is a magnification of the third lens group at a wide angle end.

(28) The zoom lens described in any one of aspects (1) to (26) is characterized in that the third lens group satisfies $$2.0 < \beta_{3T}/\beta_{3W} < 3.0 \quad [10]$$

where $\beta_{3T}$ is a magnification of the third lens group at a telephoto end, and $\beta_{3W}$ is a magnification of the third lens group at a wide angle end.

(29) The zoom lens described in any one of aspects (1) to (28) is characterized in that the second lens group has an aspherical surface on at least one surface thereof.

(30) The zoom lens described in aspect (29) is characterized in that the aspherical surface of the second lens group is a hybrid aspherical surface obtained by forming an aspherical resin on a glass spherical surface.

(31) The zoom lens described in any one of aspects (1) to (30) is characterized in that the zoom lens satisfies $$1.5 < SD/Y_{max} < 4.5 \quad [11]$$

where SD is a sum of distances from surfaces of the respective lens groups which are located closest to the object side to surfaces thereof which are closest to the image side, and $Y_{max}$ is a diagonal length of an image sensing element.

(32) The zoom lens described in any one of aspects (1) to (30) is characterized in that the zoom lens satisfies $$2.0 < SD/Y_{max} < 3.0 \quad [12]$$

where SD is a sum of distances from surfaces of the respective lens groups which are located closest to the object side to surfaces thereof which are closest to the image side, and $Y_{max}$ is a diagonal length of an image sensing element.

(33) The zoom lens described in any one of aspects (1) to (32) is characterized in that when the magnification is to be changed from the wide angle end to the telephoto end, at least the first lens group and the third lens group move to the object side, and the second lens group moves in an optical axis direction so as to increase a gap between the first lens group and the second lens group and decrease a gap between the second lens group and the third lens group.

(34) The zoom lens described in any one of aspects (1) to (33) is characterized in that when the magnification is to be changed from the wide angle end to the telephoto end, the first lens group and the third lens group move integrally.

(35) The zoom lens described in any one of aspects (1) to (33) is characterized in that focusing is performed from infinity to a finite distance by moving the at least fourth lens group.

(36) The zoom lens described in any one of aspects (1) to (35) is characterized in that a position of the fourth lens group at the telephoto end is located closer to the image side than a position of the fourth lens group at the wide angle end.

(37) The zoom lens described in any one of aspects (1) to (36) is characterized in that a zoom ratio of the zoom lens is not less than 5.0 and not more than 7.0.

The respective aspects associated with the zoom lens (A) having the first arrangement according to the present invention, those associated with the zoom lens (B) having the second arrangement, those associated with zoom lens (C) having the third arrangement, and those associated with common portions (D) concerning the first to third arrangements will be described separately.

(A) Zoom Lens Having First Arrangement in Present Invention

According to aspect (1), if the first lens group is comprised of two lenses, i.e., one negative lens and one positive lens, and sufficient achromatization is realized by the first lens group, the longitudinal chromatic aberration and lateral chromatic aberration on the telephoto end, in particular, can be suppressed small. As compared with the conventional arrangement in which the first lens group is comprised of a total of three lenses, i.e., one negative lens and two positive lenses, the arrangement of this aspect can reduce the thickness of the first lens group and the front-element diameter, thus realizing a compact structure. When the first lens group is designed to be movable in zooming operation, since the first lens group can be made relatively lightweight, the load applied to the driving mechanism can be reduced (this applies to aspects (8) and (15)). In addition, in the third group, the positive lens and negative lens are sequentially arranged from the object side. This reduces the ray height of the negative lens so as to reduce the Petzval sum, thereby suppressing the curvature of field and aberration variations in zooming operation (this applies to aspect (8)). When an aperture stop is to be placed in the air gap between the second lens group and the third lens group, astigmatism can be properly corrected by forming that lens of the third lens group spaced apart from the aperture stop which is located closest to the image side into an aspherical surface.

According to aspect (2), an aperture stop is preferably placed in the air gap between the second lens group and the third lens group to simultaneously ensure the telecentricity required for an image sensing element formed from a CCD or CMOS and reduce the front-element diameter and rear-element diameter. In addition, the lens near the aperture stop properly corrects spherical aberration and coma, and astigmatism can be properly corrected by forming that lens of the third lens group located relatively distant from the aperture stop which is located closest to the image side into an aspherical surface.

According to aspect (3), if an aperture stop is placed at the same position as in aspect (2), since a light beam passing through that lens of the third lens group which is located closest to the object side is relatively thick both on the axis and off the axis, this portion is most susceptible to the influence of a lens surface shape error. In order to reduce the influence, this lens is formed into a glass spherical lens by polishing, thereby suppressing a surface undulation error (aspherical surface error) in a manufacturing process more than in a glass mold lens formed by molding and a plastic lens formed by injection molding (this applies to aspects (10) and (17)).

According to aspect (4), in a four-group zoom lens, since there is no optical element (optical component) having power after the fourth lens group, the aberration caused by the fourth lens group is not magnified on the subsequent optical path, and hence is not noticeable. Therefore, since achromatization or the like performed by using two or more lenses including positive and negative lenses has little influence on the optical performance of the overall lens system, the fourth lens group is formed by using only one positive lens, thus reducing the number of lenses used (this applies to aspects (5), (11), and (15)).

According to aspect (5), the optical performance concerning a reduction in distortion is improved by forming at least one surface of one positive lens in aspect (4) into an aspherical surface.

According to aspects (6) and (7), using a plastic lens for the fourth lens group makes it possible to reduce the load applied when the fourth lens group is moved in zooming or focusing operation. The magnification of the fourth lens group is relatively low, and the on-axis height and off-axis thickness of a ray passing through the fourth lens group are small. Even if, therefore, the lens shape or refractive index changes due to a change in temperature, the image plane shift is relatively small, and deterioration in optical performance is small. Note that good optical performance can be realized by using a glass mold aspherical surface or hybrid aspherical surface for the fourth lens group (this applies to aspects (13), (14), (19), and (20)).

(B) Zoom Lens Having Second Arrangement in Present Invention

According to aspect (8), if the first lens group is comprised of two lenses, i.e., one negative lens and one positive lens, and sufficient achromatization is realized by the first lens group, the longitudinal chromatic aberration and lateral chromatic aberration on the telephoto end, in particular, can be suppressed small. As compared with the conventional arrangement in which the first lens group is comprised of a total of three lenses, i.e., one negative lens and two positive lenses, the arrangement of this aspect can reduce the thickness of the first lens group and the front-element diameter, thus realizing a compact structure. When the first lens group is designed to be movable in zooming operation, since the first lens group can be made relatively lightweight, the load applied to the driving mechanism can be reduced (see the description of aspect (1)). If the positive lens, positive lens, and negative lens are arranged in the third lens group in the order named, the positive power can be divided to low powers. This makes it possible to reduce spherical aberration and coma caused in the positive lenses and suppress variations in aberration in zooming operation. Even if lens decenter occurs in an assembly process, aberration variations can be suppressed small. In addition, when an aperture stop is to be placed in the air gap between the second lens group and the third lens group, astigmatism can be properly corrected by forming that lens of the third lens group spaced apart from the aperture stop which is located closest to the image side into an aspherical surface.

The above description of aspect (2) applies to aspect (9).

According to aspect (10), this lens is formed into a glass spherical lens by polishing to suppress a surface undulation error (aspherical surface error) in a manufacturing process more than in a glass mold lens formed by molding and a plastic lens formed by injection molding.

The above description of aspect (4) applies to aspect (11).

According to aspect (12), the optical performance concerning a reduction in distortion is improved by forming at least one surface of one positive lens in aspect (11) into an aspherical surface.

The descriptions of aspects (6) and (7) apply to aspects (13) and (14), respectively.

(C) Zoom Lens Having Third Arrangement in Present Invention

According to aspect (15), if the first lens group is comprised of two lenses, i.e., one negative lens and one positive lens, and sufficient achromatization is realized by the first lens group, the longitudinal chromatic aberration and lateral chromatic aberration on the telephoto end, in particular, can be suppressed small. As compared with the conventional arrangement in which the first lens group is comprised of a total of three lenses, i.e., one negative lens and two positive lenses, the arrangement of this aspect can reduce the thickness of the first lens group and the front-element diameter, thus realizing a compact structure. When the first lens group is designed to be movable in zooming operation, since the first lens group can be made relatively lightweight, the load applied to the driving mechanism can be reduced (see the description of aspect (1)). Note that astigmatism can also be properly corrected by forming that lens of the third lens group located relatively distant from the aperture stop which is located closest to the image side into an aspherical surface (see the description of aspect (8)). Furthermore, in a four-group zoom lens, since there is no optical element (optical component) having power after the fourth lens group, the aberration caused by the fourth lens group is not magnified on the subsequent optical path, and hence is not noticeable. Therefore, since achromatization or the like performed by using two or more lenses including positive and negative lenses has little influence on the overall optical performance of the lens system, the fourth lens group is formed by using only one positive lens, thus reducing the number of lenses used (see the description of aspect (4)).

The descriptions of aspects (2), (10), and (12) apply to aspects (16), (17), and (18), respectively.

The descriptions of aspects (6) and (7) apply to aspects (19) and (20), respectively.

(D) About First to Third Zoom Lenses of Present Invention

The lenses described in aspects (21) to (28) are defined to satisfy conditional expressions [3] to [10] to be described later, respectively.

According to aspect (29), at least one aspherical surface is used in the second lens group to properly correct the distortion, astigmatism, and the like, in particular, on the wide angle end.

According to aspect (30), in the zoom lens described in aspect (29), a glass spherical lens and an aspherical resin are combined to expand the range of choice of glass materials and increase the correction effects for aberrations as compared with a glass mold aspherical lens. Note that the compound lens is formed by providing a thin aspherical resin layer on a glass matrix surface lens, and hence is regarded as a single lens.

According to aspects (31) and (32), the lens described in aspect (31) is defined to satisfy conditional expression [11] to be described later, and the lens described in aspect (32) is defined to satisfy conditional expression [12] to be described later. A compact structure is realized by suppressing an increase in the thickness of the lens in the optical axis direction while maintaining various kinds of performance.

According to aspect (33), when the magnification is to be changed from the wide angle end to the telephoto end, at least the first and third lens groups move to the object side, and the second lens group moves in the optical axis direction so as to increase the gap between the first lens group and the second lens group and decrease the gap between the second lens group and the third lens group. Therefore, the same zoom ratio as that of a zoom lens of the type that changes the magnification only by moving the second lens group can be realized by the second lens group having a lower power and with a smaller moving amount. This makes it possible to attain both compactness and good optical performance. In addition, since the first lens group can be placed at a position relatively close to the entrance pupil on the wide angle end, the front-element diameter can be set to be relatively small.

According to aspect (34), the magnification is changed from the wide angle end to the telephoto end by integrally moving the first and third lens groups. This further simplifies the lens barrel structure and driving mechanism, thus achieving ease of use.

According to aspect (35), when focusing is to be performed from an infinite object to a nearby object, a so-called rear focusing method is used, i.e., the fourth lens group is moved to the object side, thereby realizing a compact lens structure. Note that if focusing is performed by using the first lens group, a large front-element diameter is required to ensure a sufficient relative illumination at a close-up distance.

According to aspect (36), the fourth lens group at the telephoto end is located closer to the image side than that at the wide angle end so as to make the movement route required for focusing at the telephoto end include the movement route required for focusing from infinity at the wide angle end to a close-up distance, thereby reducing the size of the zoom lens in the optical axis direction.

According to aspect (37), the zoom ratio of the zoom lens is defined to be 5.0 or more and 7.0 or less to ensure a high zoom ratio.

The respective conditional expressions in the respective aspects will be described next.

Conditional expression [1] defines the relationship between the refraction power of the overall lens system at the wide angle end and the refraction power of the fourth lens group. Setting a value equal to or more than the lower limit of the conditional expression will prevent the moving amount required for focusing from becoming too large due to too low power of the fourth lens group, thereby realizing a compact structure. Setting a value equal to or less than the upper limit value of the conditional expression will prevent the power of the fourth lens group from becoming too high, leading to only a slight deterioration in optical performance due to various aberrations caused in this lens group and decenter and shape errors. This makes it possible to maintain good optical performance (associated with aspects (6), (13), and (19)).

Conditional expression [2] further defines conditional expression [1] (associated with aspects (7), (14), and (20)).

Conditional expression [3] defines the relationship between the refraction power of the overall system at the wide angle end and the refraction power of that plastic lens of the third lens group which is located closest to the image side. Within the range of the conditional expression, the power of the plastic lens decreases, and the image plane shift upon a change in the temperature of the plastic lens can be suppressed small (associated with aspect (21)).

Conditional expression [4] further defines conditional expression [3] (associated with aspect (22)).

Conditional expression [5] defines the relationship between the refraction power of the overall lens system at the wide angle end and the refraction power of the first lens group. With a value equal to or more than the lower limit of the conditional expression, the power of the first lens group does not become too low, and the magnifications of the second lens group and the subsequent lens groups do not become too low. This makes it possible to maintain the compactness of the overall lens system. With a value equal to or less than the upper limit value of the conditional expression, the power of the first lens group does not become too high, leading to only a slight deterioration in optical performance due to various aberrations caused in this lens group and decenter and shape errors. This makes it possible to maintain good optical performance (associated with aspect (23)).

Conditional expression [6] further defines conditional expression [5] (associated with aspect (24)).

Conditional expression [7] defines the relationship between the magnification of the second lens group at the telephoto end and the magnification of the second lens group at the wide angle end. With a value equal to more than the lower limit of the conditional expression, since the contribution of the second lens group to magnification change is not too small, the loads of magnification change on the remaining groups need not be too high, leading to only a slight deterioration in optical performance due to various aberrations caused in the remaining groups and decenter and shape errors. With a value equal to or less than the upper limit value of the conditional expression, since the contribution of the second lens group to magnification change is not too large, only a slight deterioration occurs in optical performance due to various aberrations caused in the remaining groups and decenter and shape errors. This makes it possible to maintain good optical performance (associated with aspect (25)).

Conditional expression [8] further defines conditional expression [7] (associated with aspect (26)).

Conditional expression [9] defines the relationship between the magnification of the third lens group at the telephoto end and the magnification of the third lens group at the wide angle end. With a value equal to or more than the lower limit of the conditional expression, since the contribution of the third lens group to magnification change is not too small, the loads of magnification change on the remaining groups need not be too high, leading to only a slight deterioration in optical performance due to various aberrations caused in the remaining groups and decenter and shape errors. With a value equal to or less than the upper limit value of the conditional expression, since the contribution of the third lens group to magnification change is not too large, only a slight deterioration occurs in optical performance due to various aberrations caused in the remaining groups and decenter and shape errors. This makes it possible to maintain good optical performance (associated with aspect (27)).

Conditional expression [10] further defines conditional expression [7] (associated with aspect (28)).

Conditional expression [11] defines the relationship between the sum of the on-axis thicknesses of the respective lens groups and the diagonal length of the image sensing element. With a value equal to or more than the lower limit value of the conditional expression, since the lens thickness is not too small, a deterioration in optical performance due to decenter and shape errors is small. This makes it possible to maintain good optical performance. With a value equal to or less than the upper limit value of the conditional expression, since the lens thickness is not too large, a compact structure can be realized (associated with aspect (31)).

Conditional expression [12] further defines conditional expression [7] (associated with aspect (32)).

The zoom lens of the present invention has the arrangement described in the above aspects, and hence has the following effects. A low-cost zoom lens comprising a small number of lenses can be provided, which is suitable for a digital camera, video camera, and the like, and particularly has a field angle of 60° or more at the wide angle end and a zoom ratio of about 5.5 to 7.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENTS

Several preferred embodiments of the present invention will be described below with reference to the accompanying drawings. However, the present invention is not limited to them. Note that the following are the reference symbols used in each embodiment.

F: F-number

ω: half field angle r: radius of curvature of refracting surface d: gap between refracting surfaces $n_d$: refractive index of lens material for d line $v_d$: Abbe number of lens material f: focal length In each embodiment, setting the x-axis in the optical axis direction of an aspherical surface and letting h be the height of the aspherical surface in a direction perpendicular to the optical axis, K be a conic constant, and $A_4$, $A_6$, $A_8$, and $A_{10}$ be aspherical coefficients, the shape of the aspherical surface can be expressed by $$X = (h^2/r)/[1+\sqrt{\{1-(1+K)(h/r)^2\}}] + A_4 \cdot h^4 + A_6 \cdot h^6 + A_8 \cdot h^8 + A_{10} \cdot h^{10}$$

Note that the sectional views of lenses in the first to fourth embodiments are those at wide angle ends taken along their optical axes. Each of the compound lenses (the sixth to eighth surfaces) in the first to third embodiments is a set of a glass matrix surface lens and aspherical resin layer and can be regarded as a single lens.

In addition, an infrared cut filter is formed as a reflection type filter by performing a coating process on the surface of a low-pass filter. This eliminates the necessity to insert an additional absorption type infrared cut filter glass. Therefore, the thickness of the zoom lens can be reduced, and a structure advantageous for compactness can be realized.

FIRST EMBODIMENT

Figure 1:
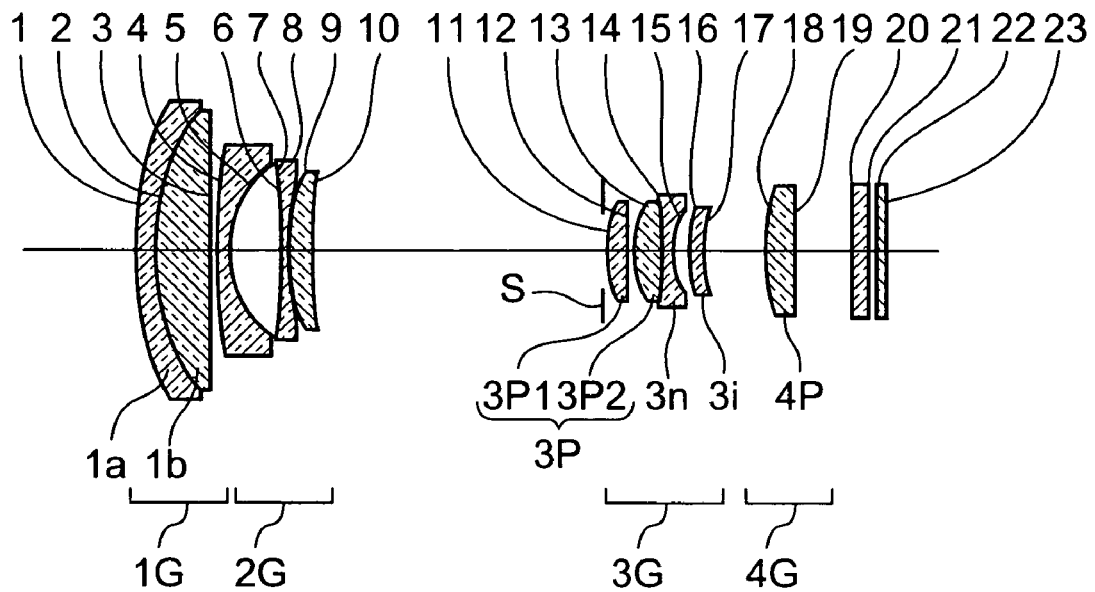
FIG. 1 is a sectional view of a zoom lens according to the first embodiment of the present invention, which is taken along the optical axis of the lens.

The first embodiment is associated with aspects (1) to (37). FIG. 1 is a sectional view of a zoom lens according to the first embodiment. Referring to FIG. 1, the zoom lens is a four group lens including positive, negative, positive, and positive lens groups arranged from the object side. A first lens group 1G includes a negative lens 1a and positive lens 1b. A third lens group 3G includes a lens 3p1, lens 3p2, lens 3n, and lens 3i. A fourth lens group 4G includes a lens 4p. An aperture stop S is placed in the air gap between a second lens group 2G and the third lens group 3G. When the magnification is to be changed from the wide angle end to the telephoto end, the first lens group 1G and third lens group 3G integrally move. Tables 1 and 2 show lens data.

Note that the sixth to eighth surfaces in the second lens group 2G constitute a hybrid aspherical lens, the lens 3i (16th and 17th surfaces) in the third lens group 3G is a plastic aspherical lens, and the lens 4p (18th and 19th surfaces) in the fourth lens group 4G is a plastic aspherical lens.

TABLE 1 f: 8.12 to 53.51 zoom ratio: 6.59
ω: 31.1° to 4.8°

| Surface Number | r (mm) | d (mm) | $n_d$ | $v_d$ |
|---|---|---|---|---|
| 1 | 28.247 | 1.20 | 1.84666 | 23.8 |
| 2 | 18.760 | 4.98 | 1.66672 | 48.3 |
| 3 | 260.290 | $d_1$(variable) | | |
| 4 | 59.800 | 1.00 | 1.72916 | 54.7 |
| 5 | 7.788 | 4.03 | | |
| 6 | −52.375* | 0.05 | 1.50706 | 53.6 |
| 7 | −69.979 | 0.80 | 1.72916 | 54.7 |
| 8 | 28.667 | 0.20 | | |
| 9 | 15.200 | 1.86 | 1.84666 | 23.8 |
| 10 | 52.331 | $d_2$(variable) | | |
| 11 | 12.757 | 1.59 | 1.72916 | 54.7 |
| 12 | 488.822 | 0.49 | | |
| 13 | 7.558 | 2.40 | 1.62299 | 58.2 |
| 14 | −62.278 | 0.89 | 1.69895 | 30.1 |
| 15 | 6.086 | 1.74 | | |
| 16 | 13.000* | 1.00 | 1.52500 | 56.0 |
| 17 | 14.440* | $d_3$(variable) | | |
| 18 | 12.847* | 2.12 | 1.52500 | 56.0 |
| 19 | 112.339* | $d_4$(variable) | | |
| 20 | ∞ | 1.35 | 1.54880 | 67.0 |
| 21 | ∞ | 0.60 | | |
| 22 | ∞ | 0.50 | 1.51633 | 64.1 |
| 23 | ∞ | | | |

*aspherical surface

TABLE 2

| Aspheric Coefficients | |
|---|---|
| Sixth Surface | K = 0.0 |
| | $A_4 = 1.58380 \times 10^{-5}$ |
| | $A_6 = 1.26950 \times 10^{-6}$ |
| | $A_8 = -2.94130 \times 10^{-8}$ |
| | $A_{10} = 6.05060 \times 10^{-10}$ |
| 16th Surface | K = 0.0 |
| | $A_4 = -2.60000 \times 10^{-4}$ |
| | $A_6 = -7.20000 \times 10^{-6}$ |
| | $A_8 = -3.80000 \times 10^{-7}$ |
| | $A_{10} = 1.20000 \times 10^{-8}$ |
| 17th Surface | K = 0.0 |
| | $A_4 = 4.60000 \times 10^{-5}$ |
| | $A_6 = -1.91590 \times 10^{-6}$ |
| | $A_8 = -9.37180 \times 10^{-9}$ |
| | $A_{10} = -9.65970 \times 10^{-9}$ |
| 18th Surface | K = 0.0 |
| | $A_4 = -1.14700 \times 10^{-4}$ |
| | $A_6 = -1.36490 \times 10^{-6}$ |
| | $A_8 = 2.29100 \times 10^{-8}$ |
| | $A_{10} = -1.67580 \times 10^{-9}$ |
| 19th Surface | K = 0.0 |
| | $A_4 = -1.14170 \times 10^{-4}$ |
| | $A_6 = -6.25870 \times 10^{-7}$ |
| | $A_8 = -2.08220 \times 10^{-8}$ |
| | $A_{10} = -8.82490 \times 10^{-10}$ |

| Focal Length | $d_1$ | $d_2$ | $d_3$ | $d_4$ |
|---|---|---|---|---|
| 8.12 | 0.50 | 24.361 | 5.351 | 4.992 |
| 20.37 | 14.258 | 10.603 | 8.812 | 6.766 |
| 53.51 | 22.661 | 2.200 | 23.670 | 3.673 |

| Division | wide angle end | intermediate | telephoto end |
|---|---|---|---|
| Image plane shift | 0.027 | 0.040 | 0.041 |

Figure 2A:
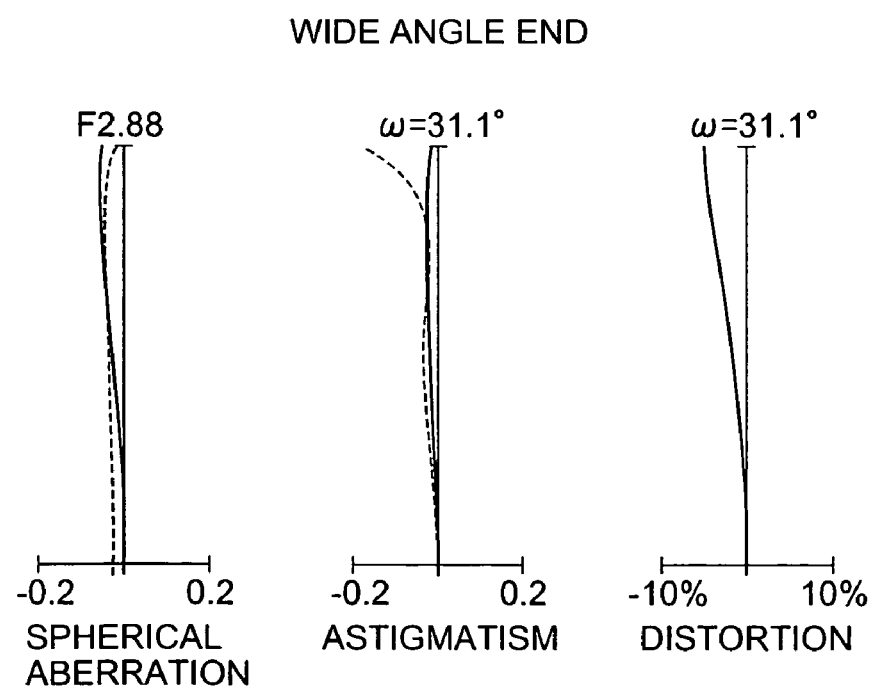
FIGS. 2A to 2C are lens aberration charts at the wide angle end, intermediate, and telephoto end in the zoom lens shown in FIG. 1.
Figure 2B:
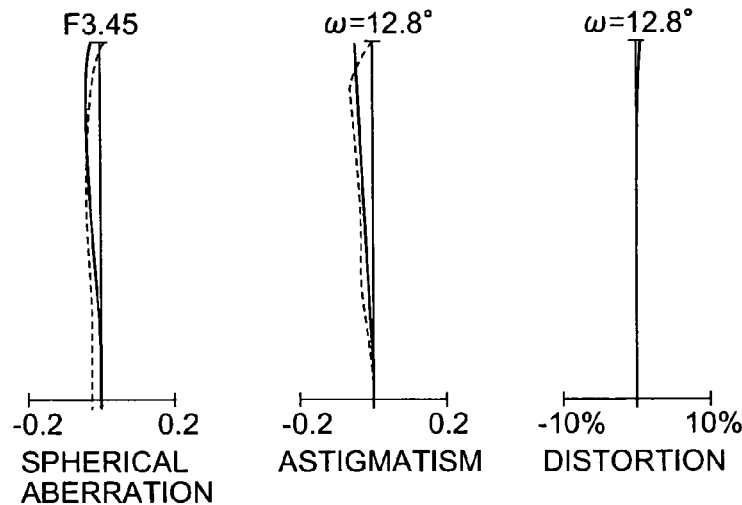
Figure 2C:
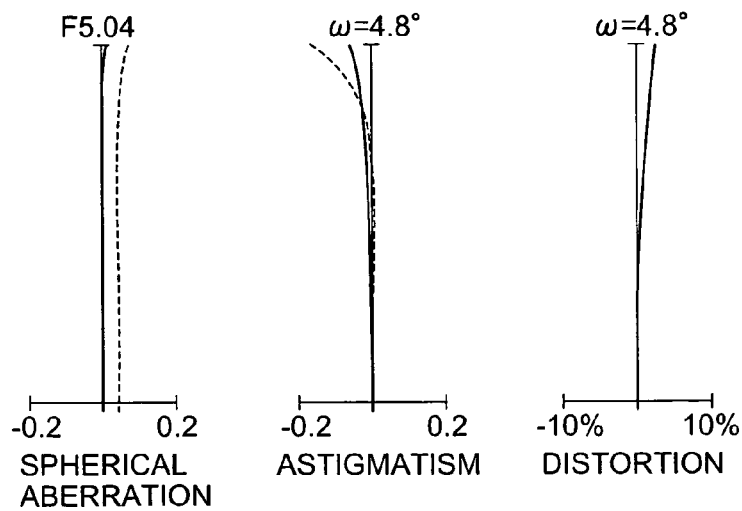

Note that the above image plane shifts are the values obtained with a d line at a room temperature of +30° C. stop position: 0.30 mm forward of 11th surface FIGS. 2A to 2C are lens aberration charts of the zoom lens according to the first embodiment at (a) wide angle end, (b) intermediate, and (c) telephoto end.

SECOND EMBODIMENT

Figure 3:
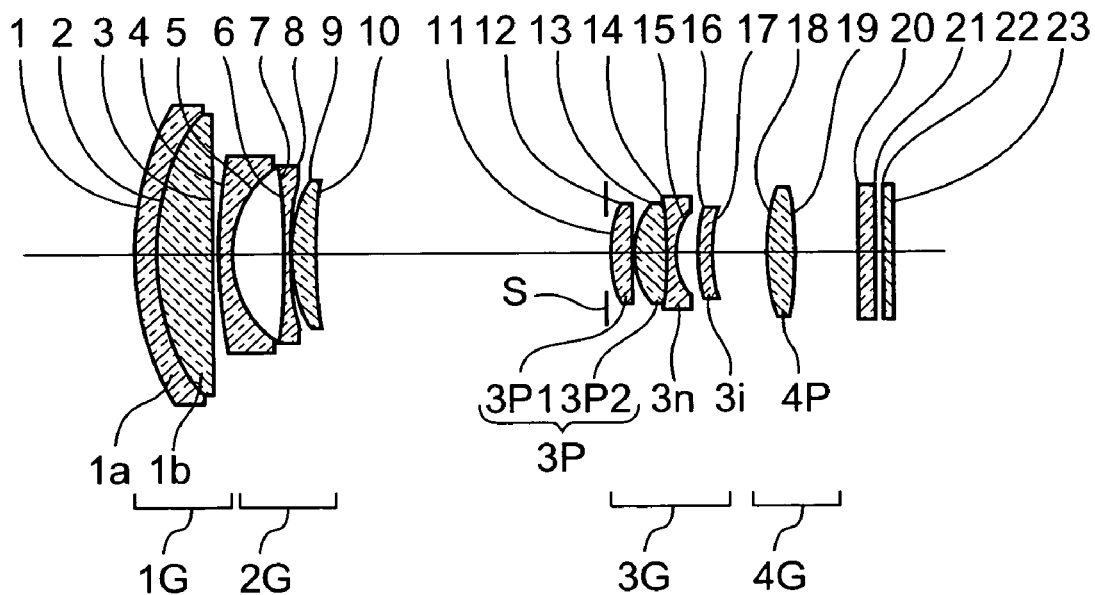
FIG. 3 is a sectional view of a zoom lens according to the second embodiment of the present invention, which is taken along the optical axis of the lens.

The second embodiment is associated with aspects (1) to (37). FIG. 3 is a sectional view of a zoom lens according to the second embodiment. Referring to FIG. 3, the zoom lens is a four group lens including positive, negative, positive, and positive lens groups arranged from the object side. A first lens group 1G includes a negative lens 1a and positive lens 1b. A third lens group 3G includes a lens 3p1, lens 3p2, lens 3n, and lens 3i. A fourth lens group 4G includes a lens 4p.

An aperture stop S is placed in the air gap between a second lens group 2G and the third lens group 3G. When the magnification is to be changed from the wide angle end to the telephoto end, the first lens group 1G and third lens group 3G integrally move.

Note that the sixth to eighth surfaces in the second lens group 2G constitute a hybrid aspherical lens, the lens 3i (16th and 17th surfaces) in the third lens group 3G is a plastic aspherical lens, and the lens 4p (18th and 19th surfaces) in the fourth lens group 4G is a plastic aspherical lens.

Tables 3 and 4 show lens data.

TABLE 3 f: 8.12 to 53.51 zoom ratio: 6.59
ω: 31.2° to 4.8°

| Surface Number | r (mm) | d (mm) | $n_d$ | $v_d$ |
|---|---|---|---|---|
| 1 | 27.860 | 1.20 | 1.84666 | 23.8 |
| 2 | 18.743 | 4.93 | 1.66672 | 48.3 |
| 3 | 217.061 | $d_1$(variable) | | |
| 4 | 50.983 | 1.00 | 1.72916 | 54.7 |
| 5 | 7.815 | 4.18 | | |
| 6 | −39.680* | 0.05 | 1.50706 | 53.6 |
| 7 | −57.824 | 0.80 | 1.72916 | 54.7 |
| 8 | 32.097 | 0.20 | | |
| 9 | 15.729 | 1.84 | 1.84666 | 23.8 |
| 10 | 55.396 | $d_2$(variable) | | |
| 11 | 12.712 | 1.54 | 1.72916 | 54.7 |
| 12 | 250.090 | 0.24 | | |
| 13 | 7.506 | 2.38 | 1.62299 | 58.2 |
| 14 | −81.508 | 0.86 | 1.69895 | 30.1 |
| 15 | 6.144 | 2.08 | | |
| 16 | 12.391* | 1.01 | 1.52500 | 56.0 |
| 17 | 13.645* | $d_3$(variable) | | |
| 18 | 14.142* | 1.87 | 1.52500 | 56.0 |
| 19 | 221.050* | $d_4$(variable) | | |
| 20 | ∞ | 1.35 | 1.54880 | 67.0 |
| 21 | ∞ | 0.60 | | |
| 22 | ∞ | 0.50 | 1.51633 | 64.1 |
| 23 | ∞ | | | |

*aspherical surface

TABLE 4

Aspheric Coefficients

| Sixth Surface | $K = 0.0$ |
| | $A_4 = 4.85560 \times 10^{-6}$ |
| | $A_6 = 1.15480 \times 10^{-6}$ |
| | $A_8 = -2.24960 \times 10^{-8}$ |
| | $A_{10} = 3.91980 \times 10^{-10}$ |
| 16th Surface | $K = 0.0$ |
| | $A_4 = -2.60000 \times 10^{-4}$ |
| | $A_6 = -6.10320 \times 10^{-6}$ |
| | $A_8 = -2.79220 \times 10^{-7}$ |
| | $A_{10} = -3.70850 \times 10^{-10}$ |
| 17th Surface | $K = 0.0$ |
| | $A_4 = 4.60000 \times 10^{-5}$ |
| | $A_6 = 2.09950 \times 10^{-6}$ |
| | $A_8 = -2.16190 \times 10^{-7}$ |
| | $A_{10} = -1.40000 \times 10^{-8}$ |
| 18th Surface | $K = 0.0$ |
| | $A_4 = -1.53010 \times 10^{-4}$ |
| | $A_6 = -2.21730 \times 10^{-6}$ |
| | $A_8 = -1.50400 \times 10^{-8}$ |
| | $A_{10} = -1.38250 \times 10^{-9}$ |
| 19th Surface | $K = 0.0$ |
| | $A_4 = -1.51240 \times 10^{-4}$ |
| | $A_6 = -1.54420 \times 10^{-6}$ |
| | $A_8 = -7.50850 \times 10^{-8}$ |
| | $A_{10} = 6.35610 \times 10^{-11}$ |

| Focal Length | $d_1$ | $d_2$ | $d_3$ | $d_4$ |
|---|---|---|---|---|
| 8.12 | 0.500 | 24.438 | 4.506 | 5.790 |
| 20.36 | 14.422 | 10.515 | 7.298 | 7.845 |
| 53.51 | 22.738 | 2.200 | 22.985 | 4.458 |

| Division | wide angle end | intermediate | telephoto end |
|---|---|---|---|
| Image plane shift | 0.029 | 0.044 | 0.043 |

Figure 4A:
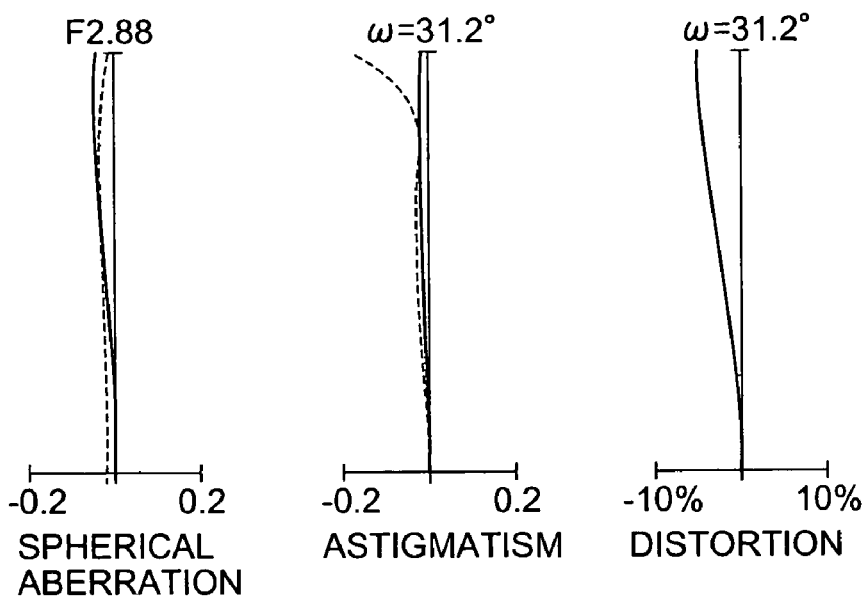
FIGS. 4A to 4C are lens aberration charts at the wide angle end, intermediate, and telephoto end in the zoom lens shown in FIG. 3.
Figure 4B:
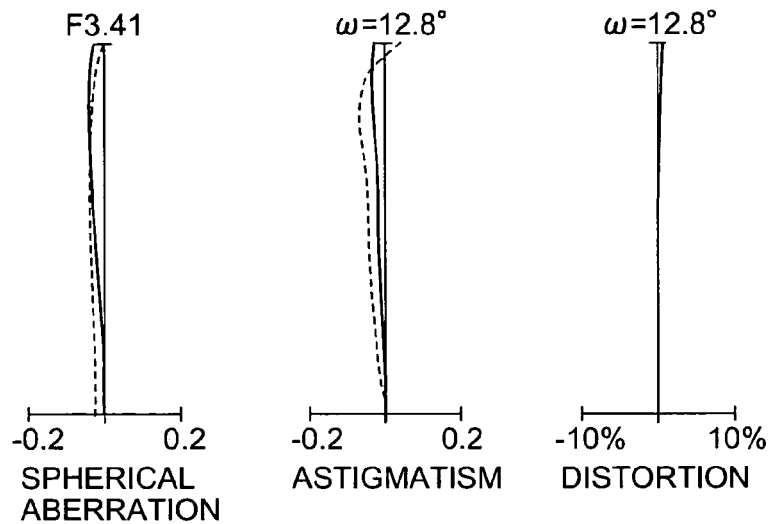
Figure 4C:
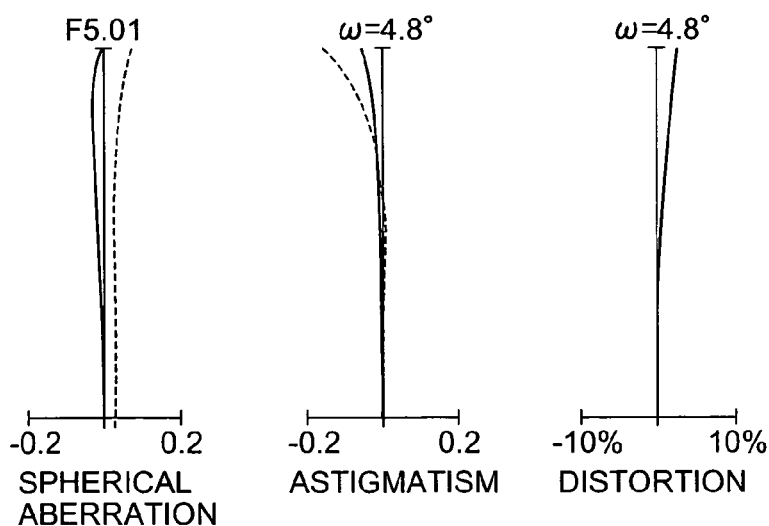

Note that the above image plane shifts are the values obtained with a d line at a room temperature of +30° C. stop position: 0.30 mm forward of 11th surface FIGS. 4A to 4C are lens aberration charts of the zoom lens according to the first embodiment at (a) wide angle end, (b) intermediate, and (c) telephoto end.

THIRD EMBODIMENT

Figure 5:
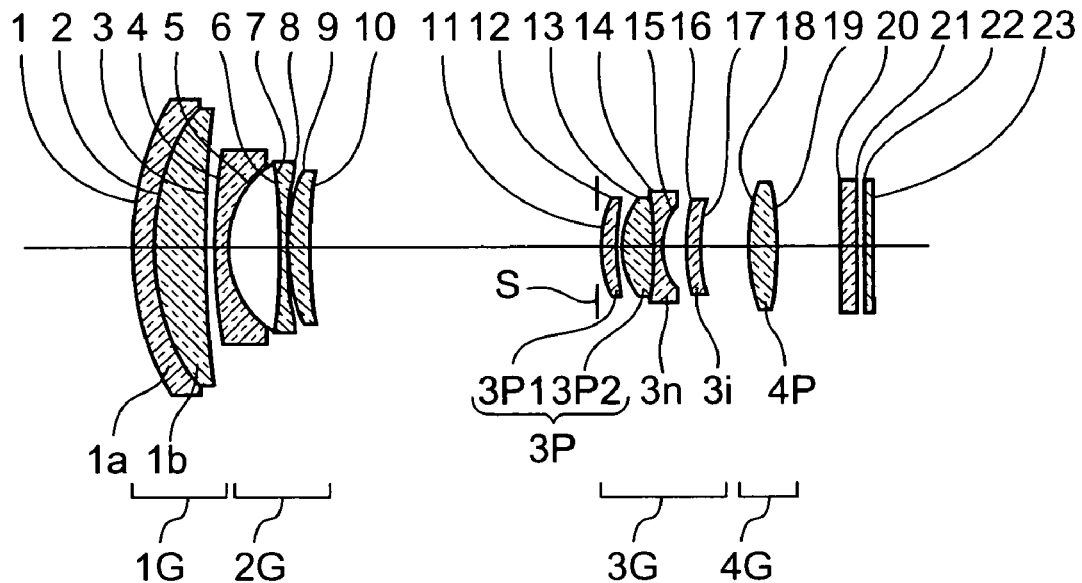
FIG. 5 is a sectional view of a zoom lens according to the third embodiment of the present invention, which is taken along the optical axis of the lens.

The third embodiment is associated with aspects (1) to (33) and (35) to (37). FIG. 5 is a sectional view of a zoom lens according to the third embodiment. Referring to FIG. 5, the zoom lens is a four group lens including positive, negative, positive, and positive lens groups arranged from the object side. A first lens group 1G includes a negative lens 1a and positive lens 1b. A third lens group 3G includes a lens 3p1, lens 3p2, lens 3n, and lens 3i. A fourth lens group 4G includes a lens 4p. An aperture stop S is placed in the air gap between a second lens group 2G and the third lens group 3G. When the magnification is to be changed from the wide angle end to the telephoto end, the first lens group 1G and third lens group 3G move. The second lens group G2 moves in the optical axis direction so as to increase the gap between the first lens group 1G and the second lens group 2G and decrease the gap between the second lens group 2G and the third lens group 3G.

Note that the sixth to eighth surfaces in the second lens group 2G constitute a hybrid aspherical lens, the lens 3i (16th and 17th surfaces) in the third lens group 3G is a plastic aspherical lens, and the lens 4p (18th and 19th surfaces) in the fourth lens group 4G is a plastic aspherical lens.

Tables 5 and 6 show lens data.

TABLE 5 f: 8.12 to 53.51 zoom ratio: 6.59
ω: 31.2° to 4.9°

| Surface Number | r(mm) | D(mm) | $n_d$ | $v_d$ |
|---|---|---|---|---|
| 1 | 27.665 | 1.20 | 1.84666 | 23.8 |
| 2 | 18.670 | 4.93 | 1.66672 | 48.3 |
| 3 | 205.524 | $d_1$(variable) | | |
| 4 | 50.117 | 1.00 | 1.72916 | 54.7 |
| 5 | 7.819 | 4.22 | | |
| 6 | −39.138* | 0.05 | 1.50706 | 53.6 |
| 7 | −58.774 | 0.80 | 1.72916 | 54.7 |
| 8 | 32.207 | 0.20 | | |
| 9 | 15.708 | 1.85 | 1.84666 | 23.8 |
| 10 | 54.754 | $d_2$(variable) | | |
| 11 | 12.794 | 1.52 | 1.72916 | 54.7 |
| 12 | 224.903 | 0.20 | | |
| 13 | 7.454 | 2.37 | 1.62299 | 58.2 |
| 14 | −87.546 | 0.86 | 1.69895 | 30.1 |
| 15 | 6.145 | 2.18 | | |
| 16 | 12.707* | 1.01 | 1.52500 | 56.0 |
| 17 | 14.052* | $d_3$(variable) | | |
| 18 | 14.277* | 1.81 | 1.52500 | 56.0 |
| 19 | 255.275* | $d_4$(variable) | | |
| 20 | ∞ | 1.35 | 1.54880 | 67.0 |
| 21 | ∞ | 0.60 | | |
| 22 | ∞ | 0.50 | 1.51633 | 64.1 |
| 23 | ∞ | | | |

*aspherical surface

TABLE 6

Aspheric Coefficients

| | |
|---|---|
| Sixth Surface | K = 0.0<br>$A_4 = 4.65120 \times 10^{-6}$<br>$A_6 = 1.17710 \times 10^{-6}$<br>$A_8 = -2.43060 \times 10^{-8}$<br>$A_{10} = 4.20170 \times 10^{-10}$ |
| 16th Surface | K = 0.0<br>$A_4 = -2.60000 \times 10^{-4}$<br>$A_6 = -6.41750 \times 10^{-6}$<br>$A_8 = -3.32110 \times 10^{-7}$<br>$A_{10} = -3.54790 \times 10^{-11}$ |
| 17th Surface | K = 0.0<br>$A_4 = 4.60000 \times 10^{-5}$<br>$A_6 = 2.04090 \times 10^{-6}$<br>$A_8 = -2.18680 \times 10^{-7}$<br>$A_{10} = -1.40000 \times 10^{-8}$ |
| 18th Surface | K = 0.0<br>$A_4 = -1.55420 \times 10^{-4}$<br>$A_6 = -2.19550 \times 10^{-6}$<br>$A_8 = -1.89500 \times 10^{-8}$<br>$A_{10} = -1.24760 \times 10^{-9}$ |
| 19th Surface | K = 0.0<br>$A_4 = -1.57620 \times 10^{-4}$<br>$A_6 = -1.50460 \times 10^{-6}$<br>$A_8 = -7.09010 \times 10^{-8}$<br>$A_{10} = -2.01360 \times 10^{-12}$ |

| Focal Length | $d_1$ | $d_2$ | $d_3$ | $d_4$ |
|---|---|---|---|---|
| 8.12 | 0.500 | 24.551 | 4.422 | 5.910 |
| 20.36 | 14.950 | 11.112 | 7.414 | 7.571 |
| 53.51 | 22.651 | 2.200 | 22.990 | 4.533 |

| Division | wide angle end | intermediate | telephoto end |
|---|---|---|---|
| Image plane shift | 0.029 | 0.042 | 0.042 |

Figure 6A:
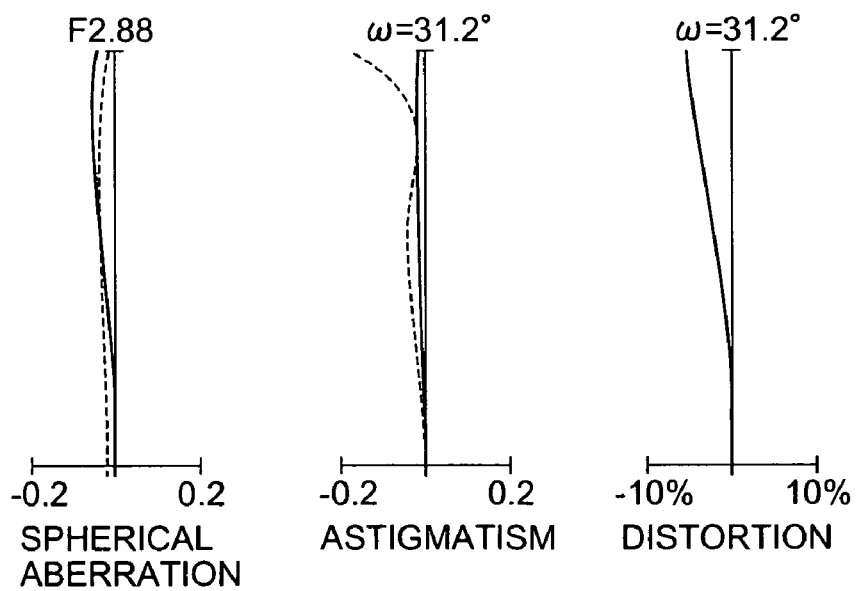
FIGS. 6A to 6C are lens aberration charts at the wide angle end, intermediate, and telephoto end in the zoom lens shown in FIG. 5.
Figure 6B:
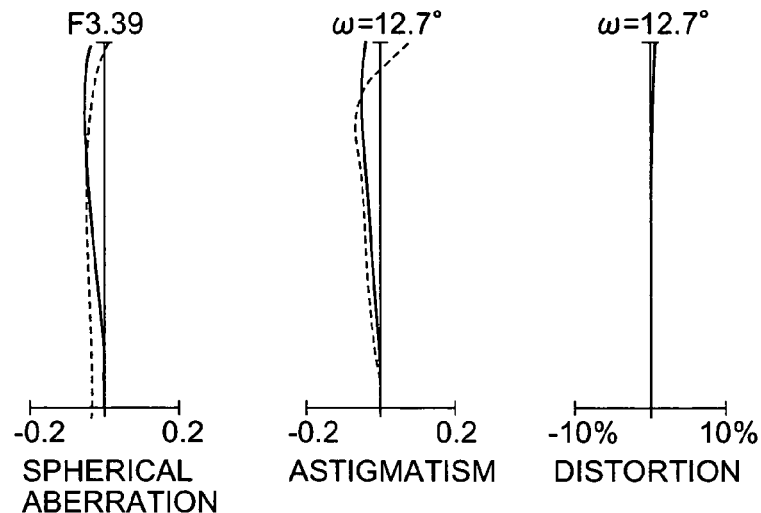
Figure 6C:
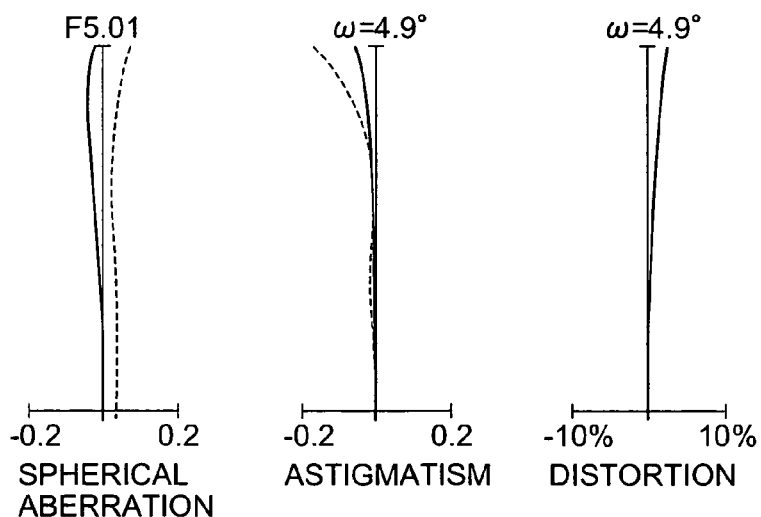

Note that the above image plane shifts are the values obtained with a d line at a room temperature of +30° C. stop position: 0.30 mm forward of 11th surface FIGS. 6A to 6C are lens aberration charts of the zoom lens according to the third embodiment at (a) wide angle end, (b) intermediate, and (c) telephoto end.

FOURTH EMBODIMENT

Figure 7:
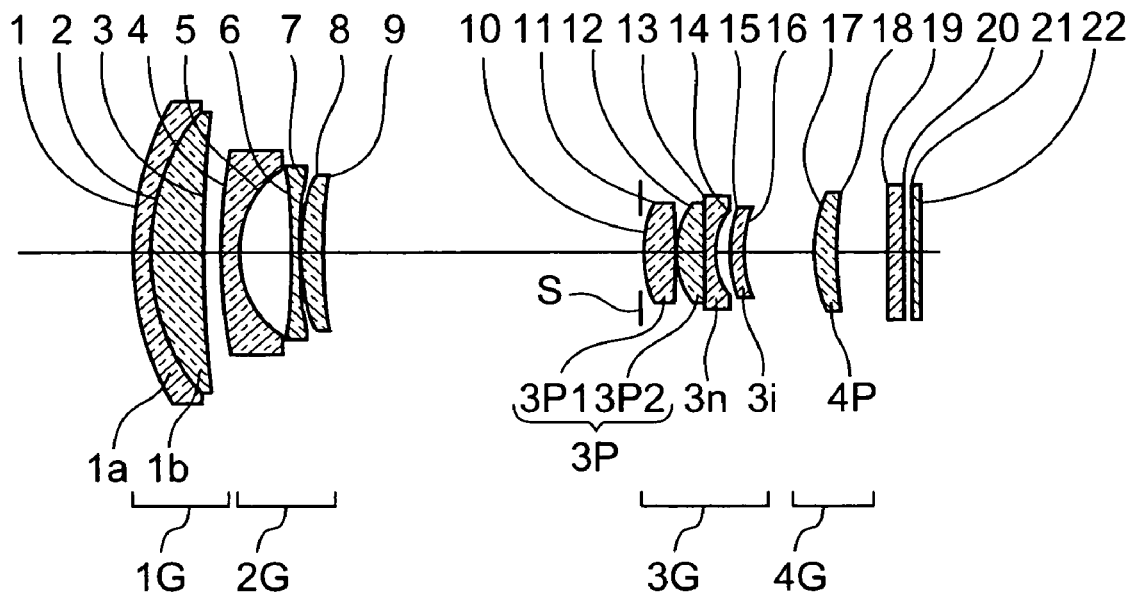
FIG. 7 is a sectional view of a zoom lens according to the fourth embodiment of the present invention, which is taken along the optical axis of the lens.

The fourth embodiment is associated with aspects (1) to (5), (8) to (12), (15) to (18), (21) to (29), (31) to (33), (35), and (37). FIG. 7 is a sectional view of a zoom lens according to the fourth embodiment. Referring to FIG. 7, the zoom lens is a four group lens including positive, negative, positive, and positive lens groups arranged from the object side. A first lens group 1G includes a negative lens 1a and positive lens 1b. A third lens group 3G includes a lens 3p1, lens 3p2, lens 3n, and lens 3i. A fourth lens group 4G includes a lens 4p. An aperture stop S is placed in the air gap between a second lens group 2G and the third lens group 3G. When the magnification is to be changed from the wide angle end to the telephoto end, the first lens group 1G and third lens group 3G move. The second lens group G2 moves in the optical axis direction so as to increase the gap between the first lens group 1G and the second lens group 2G and decrease the gap between the second lens group 2G and the third lens group 3G.

Note that the lens 3i (15th surface and 16th surface) in the third lens group 3G is a plastic aspherical.

Tables 7 and 8 show lens data.

TABLE 7 f: 8.12 to 45.87 zoom ratio: 5.65
ω: 31.2° to 5.7°

| Surface Number | r(mm) | d(mm) | $n_d$ | $v_d$ |
|---|---|---|---|---|
| 1 | 26.761 | 1.20 | 1.84666 | 23.8 |
| 2 | 18.658 | 4.64 | 1.67003 | 47.3 |
| 3 | 143.007 | $d_1$(variable) | | |
| 4 | 37.646 | 1.00 | 1.72916 | 54.7 |
| 5 | 8.182* | 4.74 | | |
| 6 | −30.123 | 0.80 | 1.72916 | 54.7 |
| 7 | 34.951 | 0.20 | | |
| 8 | 16.838 | 1.92 | 1.84666 | 23.8 |
| 9 | 65.177 | $d_2$(variable) | | |
| 10 | 12.083 | 2.56 | 1.58913 | 61.2 |
| 11 | −83.412 | 0.39 | | |
| 12 | 6.976 | 2.36 | 1.62299 | 58.2 |
| 13 | −478.343 | 0.62 | 1.71736 | 29.5 |
| 14 | 5.948 | 1.23 | | |
| 15 | 8.539* | 1.00 | 1.52500 | 56.0 |
| 16 | 8.920* | $d_3$(variable) | | |
| 17 | 15.527 | 1.76 | 1.63908 | 34.5 |
| 18 | 65.783* | $d_4$(variable) | | |
| 19 | ∞ | 1.35 | 1.54880 | 67.0 |
| 20 | ∞ | 0.60 | | |
| 21 | ∞ | 0.50 | 1.51633 | 64.1 |
| 22 | ∞ | | | |

*aspherical surface

TABLE 8

Aspheric Coefficients

| | |
|---|---|
| Fifth Surface | K = 0.0<br>$A_4 = 1.41080 \times 10^{-5}$<br>$A_6 = -6.62340 \times 10^{-8}$<br>$A_8 = 1.45490 \times 10^{-9}$<br>$A_{10} = 3.93250 \times 10^{-11}$ |
| 15th Surface | K = 0.0<br>$A_4 = -3.80000 \times 10^{-4}$<br>$A_6 = -1.60000 \times 10^{-5}$ |

TABLE 8-continued

|  | |
|---|---|
| 16th Surface | $A_8 = -1.41360 \times 10^{-8}$<br>$A_{10} = -2.00000 \times 10^{-8}$<br>$K = 0.0$<br>$A_4 = 1.60000 \times 10^{-5}$<br>$A_6 = -9.05470 \times 10^{-6}$<br>$A_8 = -5.60000 \times 10^{-8}$<br>$A_{10} = -1.40000 \times 10^{-8}$ |
| 18th Surface | $K = 0.0$<br>$A_4 = 2.70460 \times 10^{-5}$<br>$A_6 = -1.19690 \times 10^{-7}$<br>$A_8 = -1.54280 \times 10^{-8}$<br>$A_{10} = 2.51710 \times 10^{-10}$ |

| Focal Length | $d_1$ | $d_2$ | $d_3$ | $d_4$ |
|---|---|---|---|---|
| 8.12 | 1.471 | 26.364 | 6.312 | 4.165 |
| 18.30 | 13.534 | 12.153 | 6.874 | 6.750 |
| 45.87 | 21.129 | 2.000 | 18.019 | 5.994 |
| Division | wide angle end | intermediate | | telephoto end |
| Image plane shift | 0.010 | 0.014 | | 0.028 |

Figure 8A:
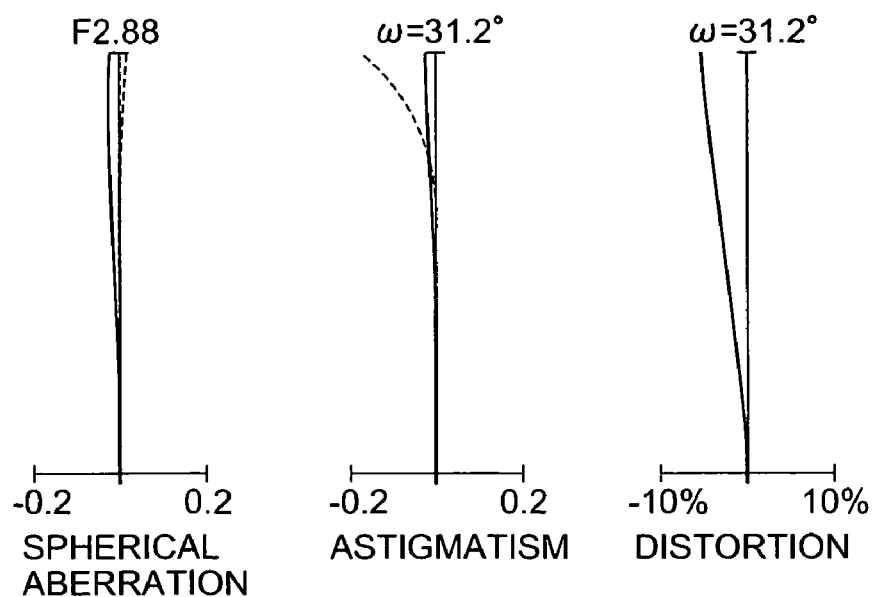
FIGS. 8A to 8C are lens aberration charts at the wide angle end, intermediate, and telephoto end in the zoom lens shown in FIG. 7.
Figure 8B:
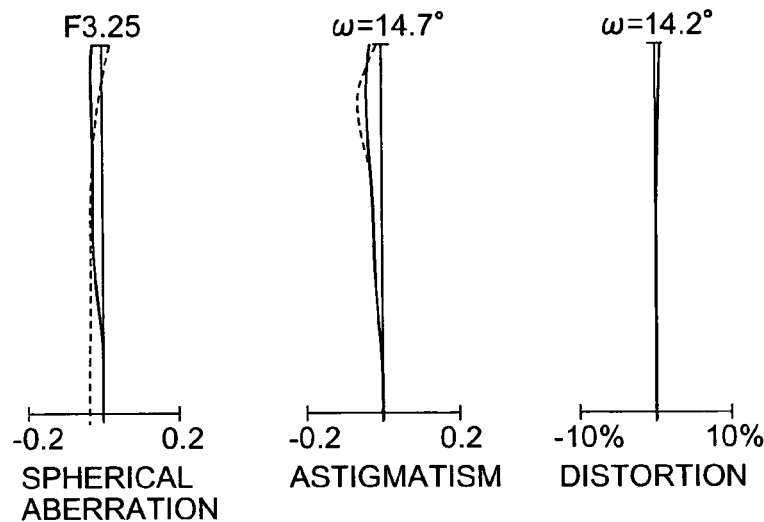
Figure 8C:
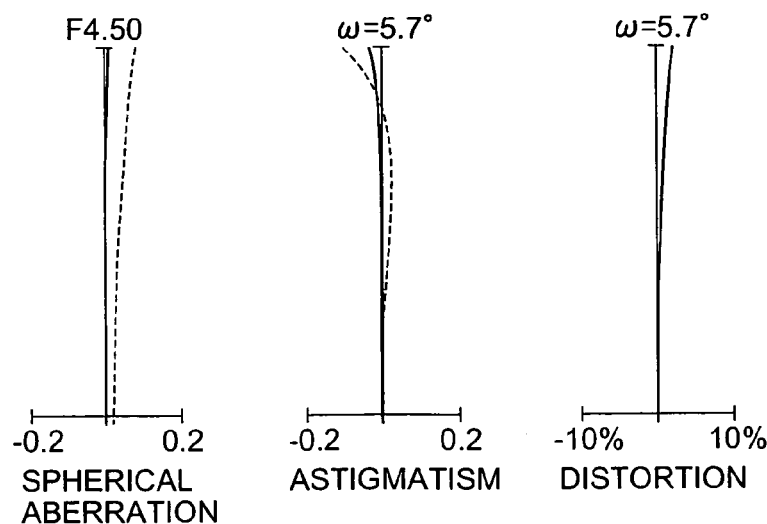

Note that the above image plane shifts are the values obtained with a d line at a room temperature of +30° C. stop position: 0.30 mm forward of 10th surface FIGS. 8A to 8C are lens aberration charts of the zoom lens according to the fourth embodiment at (a) wide angle end, (b) intermediate, and (c) telephoto end.

Table 9 shows the values of the respective conditional expressions in the first to fourth embodiments.

TABLE 9

|  | $f_w/f_4$ | $f_w/f_{3i}$ | $f_w/f_1$ | $\beta_{2T}/\beta_{2W}$ | $\beta_{3T}/\beta_{3W}$ | $SD/Y_{max}$ |
|---|---|---|---|---|---|---|
| First Embodiment | 0.30 | 0.041 | 0.15 | 2.53 | 2.42 | 2.71 |
| Second Embodiment | 0.28 | 0.040 | 0.15 | 2.55 | 2.41 | 2.70 |
| Third Embodiment | 0.28 | 0.040 | 0.15 | 2.55 | 2.41 | 2.70 |
| Fourth Embodiment | 0.26 | 0.041 | 0.15 | 2.26 | 2.72 | 2.72 |

As shown in Table 9, each embodiment satisfies the values of conditional expressions [1] to [9].

What is claimed is:

1. A zoom lens comprising:
a first lens group having a positive refraction power;
a second lens group having a negative refraction power;
a third lens group having a positive refraction power; and
a fourth lens group having a positive refraction power,
wherein said first, second, third and fourth lens groups are arranged sequentially from an object side toward an image side,
wherein a magnification is changed from a wide angle end of the zoom lens to a telephoto end thereof, and vice versa, by varying each distance between each pair of said first to said fourth lens groups, and
wherein said first lens group comprises only two pieces of lens consisting of a positive lens and a negative lens, said third lens group comprises at least a positive lens and a negative lens arranged sequentially from the object side, at least said positive lens of said third lens group is a spherical lens, and a lens of said third lens group which is located closest to the image side is a lens having an aspherical surface on at least one surface thereof.

2. A lens according to claim 1, wherein an aperture stop is placed in an air gap between said second lens group and said third lens group.

3. A lens according to claim 1, wherein said positive lens of said third lens group is a glass spherical lens formed by polishing.

4. A lens according to claim 1, wherein said fourth lens group comprises one positive lens.

5. A lens according to claim 4, wherein said positive lens of said fourth lens group has an aspherical surface on at least one surface thereof.

6. A lens according to claim 4, wherein said positive lens of said fourth lens group is made of a plastic and satisfies $$0.10 < f_W/f_4 < 0.60$$

where $f_W$ is a focal length of an overall system at a wide angle end, and $f_4$ is a focal length of said fourth lens group.

7. A lens according to claim 4, wherein said positive lens of said fourth lens group is made of a plastic and satisfies $$0.20 < f_W/f_4 < 0.40$$

where $f_W$ is a focal length of an overall system at a wide angle end, and $f_4$ is a focal length of said fourth lens group.

8. A lens according to claim 1, wherein said lens of said third lens group which is located closest to the image side is made of a plastic and satisfies $$-0.15 < f_W/f_{3i} < 0.15$$

where $f_W$ is a focal length of an overall system at a wide angle end, and $f_{3i}$ is a focal length of said lens of said third lens group which is located closest to the image side.

9. A lens according to claim 1, wherein said lens of said third lens group which is located closest to the image side is made of a plastic and satisfies $$-0.05 < f_W/f_{3i} < 0.05$$

where $f_W$ is a focal length of an overall system at a wide angle end, and $f_{3i}$ is a focal length of said lens of said third lens group which is located closest to the image side.

10. A lens according to claim 1, wherein said first lens group satisfies $$0.10 < f_W/f_1 < 0.40$$

where $f_W$ is a focal length of an overall system at a wide angle end, and $f_1$ is a focal length of said first lens group.

11. A lens according to claim 1, wherein said first lens group satisfies $$0.10 < f_W/f_1 < 0.20$$

where $f_W$ is a focal length of an overall system at a wide angle end, and $f_1$ is a focal length of said first lens group.

12. A lens according to claim 1, wherein said second lens group satisfies $$1.2 < \beta_{2T}/\beta_{2W} < 4.0$$

where $\beta_{2T}$ is a magnification of said second lens group at a telephoto end, and $\beta_{2W}$ is a magnification of said second lens group at a wide angle end.

13. A lens according to claim 1, wherein said second lens group satisfies $$2.0 < \beta_{2T}/\beta_{2W} < 3.0$$

where $\beta_{2T}$ is a magnification of said second lens group at a telephoto end, and $\beta_{2W}$ is a magnification of said second lens group at a wide angle end.

14. A lens according to claim 1, wherein said third lens group satisfies $$1.2<\beta_{3T}/\beta_{3W}<4.0$$

where $\beta_{3T}$ is a magnification of said third lens group at a telephoto end, and $\beta_{3W}$ is a magnification of said third lens group at a wide angle end.

15. A lens according to claim 1, wherein said third lens group satisfies $$2.0<\beta_{3T}/\beta_{3W}<3.0$$

where $\beta_{3T}$ is a magnification of said third lens group at a telephoto end, and $\beta_{3W}$ is a magnification of said third lens group at a wide angle end.

16. A lens according to claim 1, wherein said second lens group has an aspherical surface on at least one surface thereof.

17. A lens according to claim 16, wherein the aspherical surface of said second lens group is a hybrid aspherical surface obtained by forming an aspherical resin on a glass spherical surface.

18. A lens according to claim 1, wherein said zoom lens satisfies $$1.5<SD/Y_{max}<4.5$$

where SD is a sum of distances from surfaces of said respective lens groups which are located closest to the object side to surfaces thereof which are closest to the image side, and $Y_{max}$ is a diagonal length of an image sensing element.

19. A lens according to claim 1, wherein said zoom lens satisfies $$2.0<SD/Y_{max}<3.0$$

where SD is a sum of distances from surfaces of said respective lens groups which are located closest to the object side to surfaces thereof which are closest to the image side, and $Y_{max}$ is a diagonal length of an image sensing element.

20. A lens according to claim 1, wherein when the magnification is to be changed from the wide angle end to the telephoto end, at least said first lens group and said third lens group move to the object side, and said second lens group moves in an optical axis direction so as to increase a gap between said first lens group and said second lens group and decrease a gap between said second lens group and said third lens group.

21. A lens according to claim 1, wherein when the magnification is to be changed from the wide angle end to the telephoto end, said first lens group and said third lens group move integrally.

22. A lens according to claim 1, wherein focusing is performed from infinity to a finite distance by moving at least said fourth lens group.

23. A lens according to claim 1, wherein a position of said fourth lens group at the telephoto end is located closer to the image side than a position of said fourth lens group at the wide angle end.

24. A lens according to claim 1, wherein a zoom ratio of said zoom lens is not less than 5.0 and not more than 7.0.

25. A zoom lens comprising:
a first lens group having a positive refraction power;
a second lens group having a negative refraction power;
a third lens group having a positive refraction power; and
a fourth lens group having a positive refraction power;
wherein said first, second, third and fourth lens groups are arranged sequentially from an object side toward an image side,
wherein a magnification is changed from a wide angle end of the zoom lens to a telephoto end thereof, and vice versa, by varying each distance between each pair of said first to said fourth lens groups, and
wherein said first lens group comprises only two pieces of lens consisting of one positive lens and one negative lens, said third lens group comprises at least two positive lenses and one negative lens, and a lens of said third lens group which is located closest to the image side is a lens having an aspherical surface on at least one surface thereof.

26. A lens according to claim 25, wherein an aperture stop is placed in an air gap between said second lens group and said third lens group.

27. A lens according to claim 25, wherein said lens of said third lens group which is located closest to the object side is a glass spherical lens formed by polishing.

28. A lens according to claim 25, wherein said fourth lens group comprises one positive lens.

29. A lens according to claim 28, wherein said positive lens of said fourth lens group has an aspherical surface on at least one surface thereof.

30. A lens according to claim 28, wherein said positive lens of said fourth lens group is made of a plastic and satisfies $$0.10<f_W/f_4<0.60$$

where $f_W$ is a focal length of an overall system at a wide angle end, and $f_4$ is a focal length of said fourth lens group.

31. A lens according to claim 28, wherein said positive lens of said fourth lens group is made of a plastic and satisfies $$0.20<f_W/f_4<0.40$$

where $f_W$ is a focal length of an overall system at a wide angle end, and $f_4$ is a focal length of said fourth lens group.

32. A lens according to claim 25, wherein said lens of said third lens group which is located closest to the image side is made of a plastic and satisfies $$-0.15<f_W/f_{3i}<0.15$$

where $f_W$ is a focal length of an overall system at a wide angle end, and $f_{3i}$ is a focal length of said lens of said third lens group which is located closest to the image side.

33. A lens according to claim 25, wherein said lens of said third lens group which is located closest to the image side is made of a plastic and satisfies $$-0.05<f_W/f_{3i}<0.05$$

where $f_W$ is a focal length of an overall system at a wide angle end, and $f_{3i}$ is a focal length of said lens of said third lens group which is located closest to the image side.

34. A lens according to claim 25, wherein said first lens group satisfies $$0.10<f_W/f_1<0.40$$

where $f_W$ is a focal length of an overall system at a wide angle end, and $f_1$ is a focal length of said first lens group.

35. A lens according to claim 25, wherein said first lens group satisfies $$0.10 < f_W/f_1 < 0.20$$

where $f_W$ is a focal length of an overall system at a wide angle end, and $f_1$ is a focal length of said first lens group.

36. A lens according to claim 25, wherein said second lens group satisfies $$1.2 < \beta_{2T}/\beta_{2W} < 4.0$$

where $\beta_{2T}$ is a magnification of said second lens group at a telephoto end, and $\beta_{2W}$ is a magnification of said second lens group at a wide angle end.

37. A lens according to claim 25, wherein said second lens group satisfies $$2.0 < \beta_{2T}/\beta_{2W} < 3.0$$

where $\beta_{2T}$ is a magnification of said second lens group at a telephoto end, and $\beta_{2W}$ is a magnification of said second lens group at a wide angle end.

38. A lens according to claim 25, wherein said third lens group satisfies $$1.2 < \beta_{3T}/\beta_{3W} < 4.0$$

where $\beta_{3T}$ is a magnification of said third lens group at a telephoto end, and $\beta_{3W}$ is a magnification of said third lens group at a wide angle end.

39. A lens according to claim 25, wherein said third lens group satisfies $$2.0 < \beta_{3T}/\beta_{3W} < 3.0$$

where $\beta_{3T}$ is a magnification of said third lens group at a telephoto end, and $\beta_{3W}$ is a magnification of said third lens group at a wide angle end.

40. A lens according to claim 25, wherein said second lens group has an aspherical surface on at least one surface thereof.

41. A lens according to claim 40, wherein the aspherical surface of said second lens group is a hybrid aspherical surface obtained by forming an aspherical resin on a glass spherical surface.

42. A lens according to claim 25, wherein said zoom lens satisfies $$1.5 < SD/Y_{max} < 4.5$$

where SD is a sum of distances from surfaces of said respective lens groups which are located closest to the object side to surfaces thereof which are closest to the image side, and $Y_{max}$ is a diagonal length of an image sensing element.

43. A lens according to claim 25, wherein said zoom lens satisfies $$2.0 < SD/Y_{max} < 3.0$$

where SD is a sum of distances from surfaces of said respective lens groups which are located closest to the object side to surfaces thereof which are closest to the image side, and $Y_{max}$ is a diagonal length of an image sensing element.

44. A lens according to claim 25, wherein when the magnification is to be changed from the wide angle end to the telephoto end, at least said first lens group and said third lens group move to the object side, and said second lens group moves in an optical axis direction so as to increase a gap between said first lens group and said second lens group and decrease a gap between said second lens group and said third lens group.

45. A lens according to claim 25, wherein when the magnification is to be changed from the wide angle end to the telephoto end, said first lens group and said third lens group move integrally.

46. A lens according to claim 25, wherein focusing is performed from infinity to a finite distance by moving at least said fourth lens group.

47. A lens according to claim 25, wherein a position of said fourth lens group at the telephoto end is located closer to the image side than a position of said fourth lens group at the wide angle end.

48. A lens according to claim 25, wherein a zoom ratio of said zoom lens is not less than 5.0 and not more than 7.0.

49. A zoom lens comprising:
a first lens group having a positive refraction power;
a second lens group having a negative refraction power;
a third lens group having a positive refraction power; and
a fourth lens group having a positive refraction power;
wherein said first, second, third and fourth lens groups are arranged sequentially from an object side toward an image side,
wherein a magnification is changed from a wide angle end of the zoom lens to a telephoto end thereof, and vice versa, by varying each distance between each pair of said first to said fourth lens groups, and
wherein said first lens group comprises only two pieces of lens consisting of one positive lens and one negative lens, a lens of said third lens group which is located closest to the image side has an aspherical surface on at least one surface thereof, and said fourth lens group comprises only one piece of lens consisting of one positive lens.

50. A lens according to claim 49, wherein an aperture stop is placed in an air gap between said second lens group and said third lens group.

51. A lens according to claim 49, wherein said lens of said third lens group which is located closest to the object side is a glass spherical lens formed by polishing.

52. A lens according to claim 49, wherein said positive lens of said fourth lens group has an aspherical surface on at least one surface thereof.

53. A lens according to claim 52, wherein said positive lens of said fourth lens group is made of a plastic and satisfies $$0.10 < f_W/f_4 < 0.60$$

where $f_W$ is a focal length of an overall system at a wide angle end, and $f_4$ is a focal length of said fourth lens group.

54. A lens according to claim 52, wherein said positive lens of said fourth lens group is made of a plastic and satisfies $$0.20 < f_W/f_4 < 0.40$$

where $f_W$ is a focal length of an overall system at a wide angle end, and $f_4$ is a focal length of said fourth lens group.

55. A lens according to claim 49, wherein said lens of said third lens group which is located closest to the image side is made of a plastic and satisfies $$-0.15 < f_W/f_{3i} < 0.15$$

where $f_W$ is a focal length of an overall system at a wide angle end, and $f_{3i}$ is a focal length of said lens of said third lens group which is located closest to the image side.

56. A lens according to claim 49, wherein said lens of said third lens group which is located closest to the image side is made of a plastic and satisfies $$-0.05 < f_W/f_{3i} < 0.05$$

where $f_W$ is a focal length of an overall system at a wide angle end, and $f_{3i}$ is a focal length of said lens of said third lens group which is located closest to the image side.

57. A lens according to claim 49, wherein said first lens group satisfies $$0.10 < f_W/f_1 < 0.40$$

where $f_W$ is a focal length of an overall system at a wide angle end, and $f_1$ is a focal length of said first lens group.

58. A lens according to claim 49, wherein said first lens group satisfies $$0.10 < f_W/f_1 < 0.20$$

where $f_W$ is a focal length of an overall system at a wide angle end, and $f_1$ is a focal length of said first lens group.

59. A lens according to claim 49, wherein said second lens group satisfies $$1.2 < \beta_{2T}/\beta_{2W} < 4.0$$

where $\beta_{2T}$ is a magnification of said second lens group at a telephoto end, and $\beta_{2W}$ is a magnification of said second lens group at a wide angle end.

60. A lens according to claim 49, wherein said second lens group satisfies $$2.0 < \beta_{2T}/\beta_{2W} < 3.0$$

where $\beta_{2T}$ is a magnification of said second lens group at a telephoto end, and $\beta_{2W}$ is a magnification of said second lens group at a wide angle end.

61. A lens according to claim 49, wherein said third lens group satisfies $$1.2 < \beta_{3T}/\beta_{3W} < 4.0$$

where $\beta_{3T}$ is a magnification of said third lens group at a telephoto end, and $\beta_{3W}$ is a magnification of said third lens group at a wide angle end.

62. A lens according to claim 49, wherein said third lens group satisfies $$2.0 < \beta_{3T}/\beta_{3W} < 3.0$$

where $\beta_{3T}$ is a magnification of said third lens group at a telephoto end, and $\beta_{3W}$ is a magnification of said third lens group at a wide angle end.

63. A lens according to claim 49, wherein said second lens group has an aspherical surface on at least one surface thereof.

64. A lens according to claim 63, wherein the aspherical surface of said second lens group is a hybrid aspherical surface obtained by forming an aspherical resin on a glass spherical surface.

65. A lens according to claim 49, wherein said zoom lens satisfies $$1.5 < SD/Y_{max} < 4.5$$

where SD is a sum of distances from surfaces of said respective lens groups which are located closest to the object side to surfaces thereof which are closest to the image side, and $Y_{max}$ is a diagonal length of an image sensing element.

66. A lens according to claim 49, wherein said zoom lens satisfies $$2.0 < SD/Y_{max} < 3.0$$

where SD is a sum of distances from surfaces of said respective lens groups which are located closest to the object side to surfaces thereof which are closest to the image side, and $Y_{max}$ is a diagonal length of an image sensing element.

67. A lens according to claim 49, wherein when the magnification is to be changed from the wide angle end to the telephoto end, at least said first lens group and said third lens group move to the object side, and said second lens group moves in an optical axis direction so as to increase a gap between said first lens group and said second lens group and decrease a gap between said second lens group and said third lens group.

68. A lens according to claim 49, wherein when the magnification is to be changed from the wide angle end to the telephoto end, said first lens group and said third lens group move integrally.

69. A lens according to claim 49, wherein focusing is performed from infinity to a finite distance by moving at least said fourth lens group.

70. A lens according to claim 49, wherein a position of said fourth lens group at the telephoto end is located closer to the image side than a position of said fourth lens group at the wide angle end.

71. A lens according to claim 49, wherein a zoom ratio of said zoom lens is not less than 5.0 and not more than 7.0.

* * * * *